Figure 6:
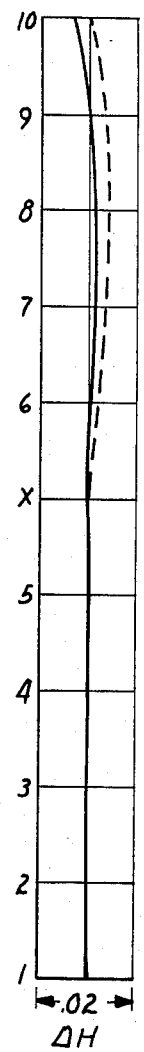

United States Patent
Conrad

[11] 3,994,575
[45] Nov. 30, 1976

[54] WIDE ANGLE OBJECTIVE LENS
[75] Inventor: Lawrence H. Conrad, Maplewood, Minn.
[73] Assignee: Minnesota Mining and Manufacturing Company, Saint Paul, Minn.
[22] Filed: Sept. 15, 1975
[21] Appl. No.: 613,483

Related U.S. Application Data
[63] Continuation-in-part of Ser. No. 528,012, Nov. 29, 1974, abandoned.

[52] U.S. Cl. .................................................. 350/214
[51] Int. Cl.² ......................................... G02B 9/64
[58] Field of Search ...................................... 350/214

[56] References Cited
UNITED STATES PATENTS
3,234,849   2/1966   Back .................................. 350/214

FOREIGN PATENTS OR APPLICATIONS
31,098   9/1964   Germany ........................ 350/214

Primary Examiner—John K. Corbin
Assistant Examiner—Conrad Clark
Attorney, Agent, or Firm—Alexander, Sell, Steldt & DeLaHunt

[57] ABSTRACT

A wide angle objective lens comprising from front to rear a double-plano filter, a negative meniscus lens element, a second negative meniscus lens element, a cemented doublet consisting of a biconvex lens element and a biconcave lens element, a second cemented doublet consisting of a biconcave lens element and a positive meniscus lens element, a third cemented doublet consisting of two plano-convex lens elements, a negative meniscus lens element and a double-plano protective cover plate.

1 Claim, 9 Drawing Figures

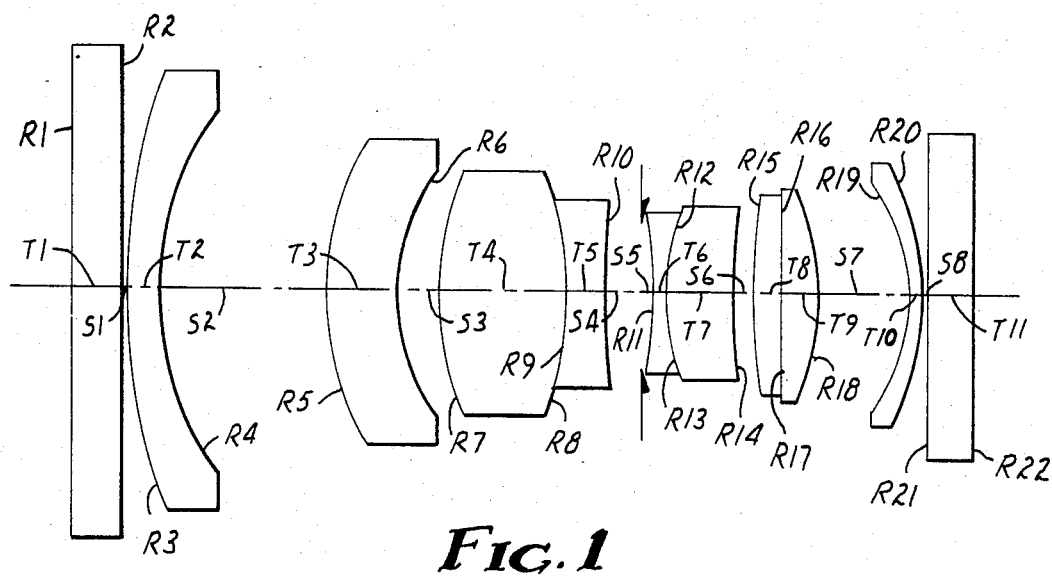
FIG. 1
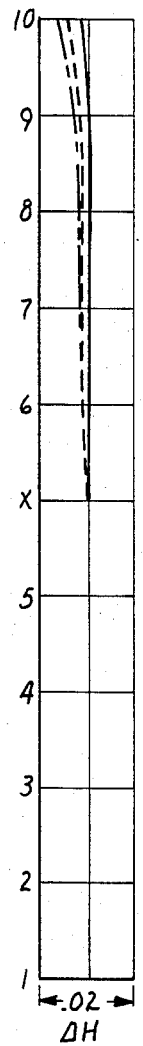 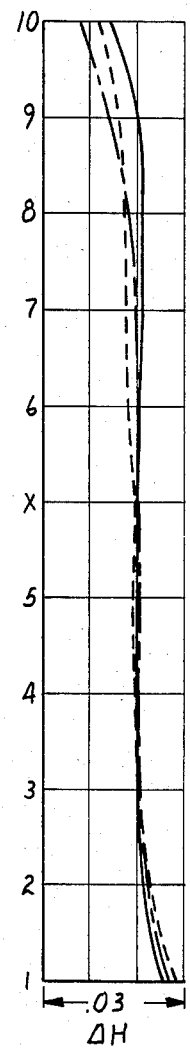 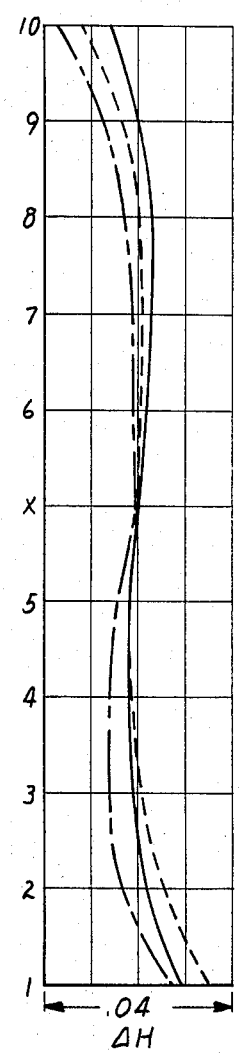 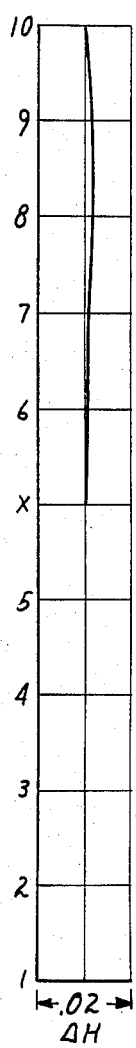
FIG.2  FIG.3  FIG.4  FIG.5

WIDE ANGLE OBJECTIVE LENS

REFERENCE TO RELATED APPLICATION

This application is a continuation-in-part of application Ser. No. 528,012 filed on Nov. 29, 1974 now abandoned.

FIELD OF THE INVENTION

The present invention relates to a wide angle objective lens particularly adapted for use in microphotography.

BACKGROUND OF THE INVENTION

Microphotographic objective lenses must have high resolution and maximum contrast with minimum aberrations to provide acceptable results. When the desirable light path requires the use of a mirror, the objective lens must have a long back focal distance. To accomplish these objectives the prior art lenses have used many negative lens elements which has resulted in the distortion of the lens being large and the color correction at the 70 percent field of view becoming a problem.

According to the present invention there is provided an objective lens which has less than one percent distortion with a long back focal distance, wide angle coverage, high resolution and excellent color correction. The lens comprises from front to rear a double-plano filter, a negative meniscus lens element, a second negative meniscus lens element, a cemented doublet consisting of a biconvex lens element and a biconcave lens element, a second cemented doublet consisting of a biconcave lens element and a positive meniscus lens element, a third cemented doublet consisting of two planoconvex lens elements, a negative meniscus lens element and a double-plano protective cover plate.

THE DRAWING

Figure 7:
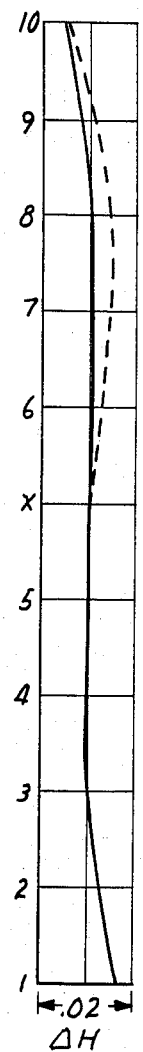
Figure 8:
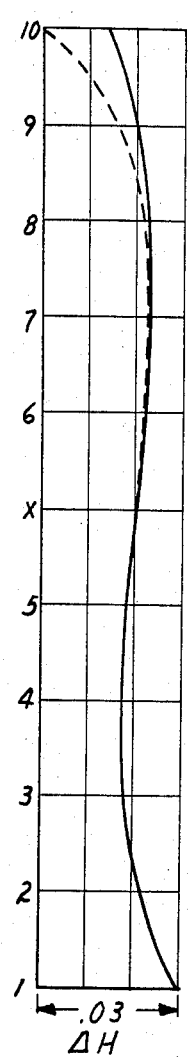
Figure 9:
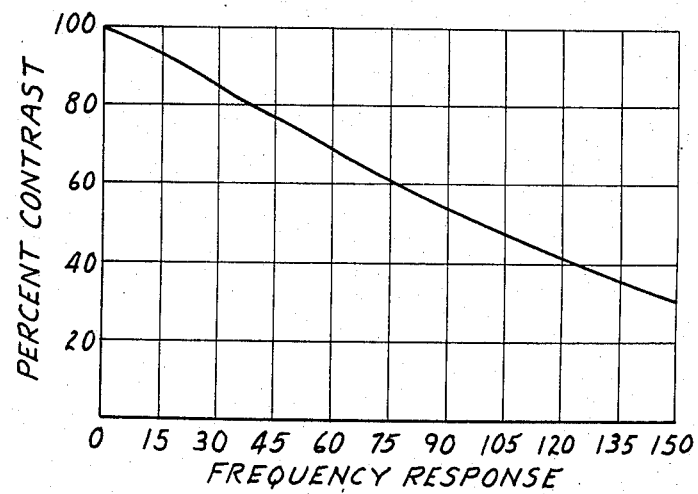
Figure 10:
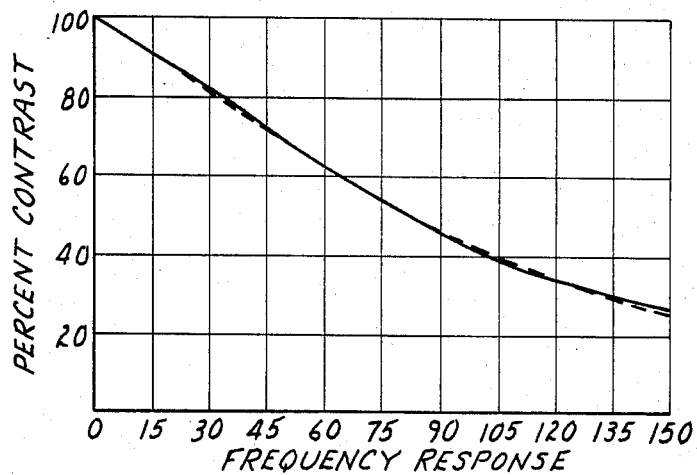
Figure 11:
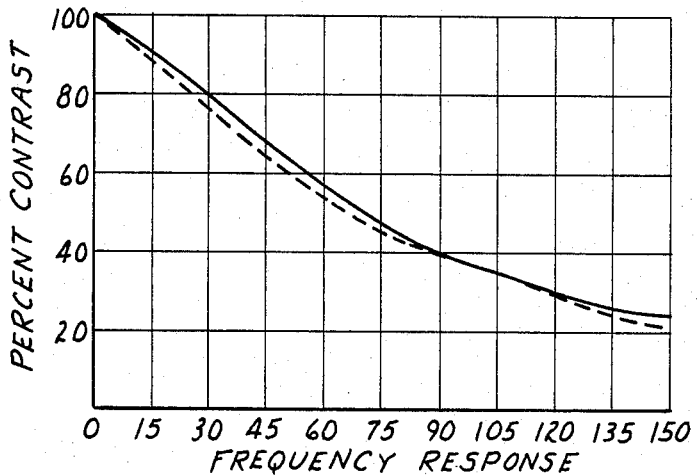
Figure 12:
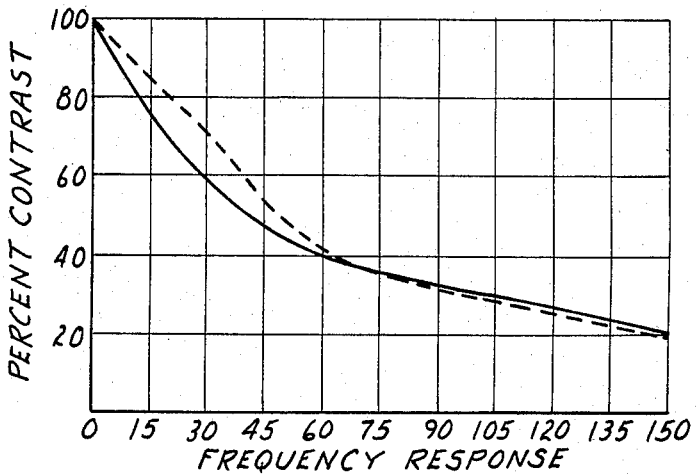

In the drawing:

FIG. 1 is a diagrammatic axial cross section of a lens constructed in accordance with the present invention;

FIGS. 2, 3 and 4 are tangential oblique ray intercept curves along the axis and through 70 percent and 100 percent, respectively, of its field of view;

FIGS. 5, 6, 7 and 8 are tangential and sagittal oblique ray intercept curves along the axis and through 50 percent, 70 percent and 100 percent, respectively, of its field of view; and FIGS. 9, 10, 11 and 12 are modulation transfer function traces along the axis and through 50 percent, 70 percent and 100 percent, respectively of its field of view.

The microphotographic objective lens of the present invention comprises from front to rear a double-plano filter 1, a negative meniscus lens element 2, a second negative meniscus lens element 3, a cemented doublet consisting of a biconvex lens element 4, and a biconcave lens element 5, a second cemented doublet consisting of a biconcave lens element 6 and a positive meniscus lens element 7, a third cemented doublet consisting of two plano-convex lens elements 8 and 9, a negative meniscus lens element 10 and double-plano protective cover plate 11.

Numerical data for constructing an objective lens according to the invention is given in the following table in which the lens elements are numbered from front to rear, N is the index of refraction of the lens elements for the Sodium $d$ line, V is the index of dispersion, and R, T and S refer, respectively to the radii of curvature of the lens surfaces, the axial thickness of the lens elements and the air spaces between the elements, numbered by subscript from front to rear. The plug and minus values of the radii, R, denote surfaces that are, respectively, convex and concave toward the front.

| Element | $N_d$ | V | Radii (m.m.) | Thicknesses and Spacings (m.m.) |
|---|---|---|---|---|
|   |   |   | Equivalent Focal Length = 54.4 m.m. f/6 |   |
| 1 | Filter GG-395 |   | $R_1 = \infty$<br>$R_2 = \infty$ | $t_1 = 4.0$<br>$s_1 = 0.5$ |
|   |   |   | $R_3 = +52.317$ | $t_2 = 2.45$ |
| 2 | 1.51742 | 52.3 | $R_4 = +23.982$ | $s_2 = 14.47$ |
|   |   |   | $R_5 = +24.69$ | $t_3 = 5.88$ |
| 3 | 1.51835 | 60.3 | $R_6 = +16.85$ | $s_3 = 3.61$ |
|   |   |   | $R_7 = +26.243$ |   |
| 4 | 1.7570 | 47.9 | $R_8 = -27.309$ | $t_4 = 11.16$ |
|   |   |   | $R_9 = -27.309$ | $t_5 = 2.98$ |
| 5 STOP | 1.52642 | 60.0 | $R_{10} = +240.89$ | $s_4 = 3.19$<br>$s_5 = 0.77$ |
|   |   |   | $R_{11} = -42.191$ |   |
| 6 | 1.72022 | 29.3 | $R_{12} = +19.868$ | $t_6 = 1.14$ |

| Element | $N_d$ | V | Radii (m.m.) | Thicknesses and Spacings (m.m.) |
|---|---|---|---|---|
|   |   |   | $R_{13} = +19.868$ | $t_7 = 5.62$ |
| 7 | 1.67003 | 47.2 | $R_{14} = +47.991$ | $s_6 = 1.75$ |
|   |   |   | $R_{15} = +67.586$ | $t_8 = 2.29$ |
| 8 | 1.67003 | 47.2 | $R_{16} = \infty$ |   |
|   |   |   | $R_{17} = \infty$ | $t_9 = 3.15$ |
| 9 | 1.67000 | 57.3 | $R_{18} = -22.259$ | $s_7 = 7.82$ |
|   |   |   | $R_{19} = -17.305$ | $t_{10} = 1.04$ |
| 10 | 1.67000 | 57.3 | $R_{20} = -24.324$ | $s_8 = 0.50$ |
|   |   |   | $R_{21} = \infty$ |   |
| 11 | 1.52300 | 58.6 | $R_{22} = \infty$ | $t_{11} = 3.81$ |

A lens constructed in accordance with the above specifications may be used to provide 14X, 20X, 24x and 36X magnification. The image to object distance, the front focal distance from the object plane to the front of the filter 1, and the back focal distance from the rear of the cover plate 11 to the image plane for each magnification is as follows:

| Magnification | Image to Object Distance (m.m.) | Front Focal Distance (m.m.) | Back Focal Distance (m.m.) |
|---|---|---|---|
| 14X | 895.616 | 775.7 | 43.786 |
| 20X | 1220.34 | 1101.59 | 42.619 |
| 24X | 1437.8 | 1319.5 | 42.167 |
| 36X | 2082.55 | 1965.0 | 41.417 |

The lens has less than 1.0 percent distortion at 36X and an effective image cone having a 24.5° half angle. Furthermore, this lens has a 0.05 m.m. depth of focus.

The graphs of FIGS. 2 through 4 illustrate tangential oblique ray intercept curves along the axis and through 70 percent and 100 percent of the field of view at 36X magnification. The full lines represent the tangential oblique ray intercept curves of the Sodium $d$ line while the long segment broken lines and the short segment broken lines, respectively, represent the curves for the Hydrogen F and C lines. In the graphs of FIGS. 2 through 4 the ordinate numbers represent ten equally spaced light rays, five in the upper portion of the lens and five in the lower portion with $x$ representing the center of the lens. $\Delta H'$ is the deviation in millimeters in the ray intercept height in the image plane where H', the ray intercept height in the image plane, is 25.625 m.m. at 100% of field. It can readily be seen from the magnitude of the scale expansion for ΔH' and from the fact that these curves are still nearly straight vertical lines, that a lens constructed in accordance with the present invention is extremely well corrected for spherical aberration and coma and produces very little, if any, curvature of field. The small distances between the curves for the Sodium d and the Hydrogen C and F lines show that the lens is extremely well corrected for chromatic aberrations.

The graphs of FIGS. 5 through 8 illustrate tangential and sagittal oblique ray intercept curves along the axis and through 50 percent, 70 percent and 100 percent of the field of view at 36X magnification. The full lines represent the tangential oblique ray intercept curves for the Sodium d line (as in FIGS. 2 through 4) and the broken lines represent the sagittal oblique ray intercept curves for the Sodium d line. The ordinate and abcissa in the graphs of FIGS. 5 through 8 are the same as those in the graphs of FIGS. 2 through 4. The graphs of FIGS. 5 through 8 confirm that the lens is extremely well corrected for coma and produces little, if any, curvature of field and the closeness of the tangential and sagittal traces shows that the lens is astigmatic corrected. Further, the extent of the curves of the graphs of FIGS. 5 through 8 shows that there is no vignetting.

In the graphs of FIGS. 9 through 12 the full lines represent the tangential ray modulation function traces and the broken lines represent the sagittal ray modulation function traces for the lens at 36X magnification. The units of Frequency Response are line pairs per millimeter. These graphs are weighted so that the Sodium d line contributes 60 percent and the Hydrogen C and F lines each contribute 20 percent of the energy density. This color weighting has been found to most nearly produce a white light spectrum which is optimum for both color and black and white photography. The fact that the tangential ray and sagittal ray traces are close together again shows that the lens is well corrected for astigmatism. Furthermore, from those graphs it can be seen that the contrast is far above 10 percent (the threshhold of visual acuity) even at a resolution of 150 line pairs per millimeter. The resolution, contrast, wide angle and extremely well corrected aberrations provided by this lens construction makes it highly desirable for use in microphotography.

Although the invention has been described in detail with reference to a preferred embodiment thereof, it will be understood that minor variations and modifications (e.g. scaling of the lens) can be effected without departing from the spirit and scope of the invention.

I claim:

1. An objective lens comprising from front to rear a double-plano filter, a negative meniscus lens element, a second negative meniscus lens element, a cemented doublet consisting of a biconvex lens element and a biconcave lens element, a second cemented doublet consisting of a biconcave lens element and a positive meniscus lens element, a third cemented doublet consisting of two plano-convex lens elements, a negative meniscus lens element and a double-plano protective cover plate, the lens elements having substantially the following characteristics and spacial relations in which the lens elements are numbered from front to rear, N is the index of refraction of the lens elements for the Sodium $d$ line, V is the index of dispersion, and R, T and S refer, respectively to the radii of curvature of the lens surfaces, the axial thickness of the lens elements and the air spaces between the elements, numbered by subscript from front to rear, the plus and minus values of the radii, R, denoting surfaces that are, respectively, convex and concave toward the front:

| Equivalent Focal Length = 54.4 m.m. f/6 | | | | |
|---|---|---|---|---|
| Element | $N_d$ | V | Radii (m.m.) | Thicknesses and Spacings (m.m.) |
| | Filter | | $R_1 = \infty$ | $t_1 = 4.0$ |
| 1 | GG-395 | | $R_2 = \infty$ | $s_1 = 0.5$ |
| | | | $R_3 = +52.317$ | $t_2 = 2.45$ |
| 2 | 1.51742 | 52.3 | $R_4 = +23.982$ | $s_2 = 14.47$ |
| | | | $R_5 = +24.69$ | $t_3 = 5.88$ |
| 3 | 1.51835 | 60.3 | $R_6 = +16.85$ | $s_3 = 3.61$ |

| Element | $N_d$ | V | Radii (m.m.) | Thicknesses and Spacings (m.m.) |
|---|---|---|---|---|
| | | | $R_7 = +26.243$ | $t_4 = 11.16$ |
| 4 | 1.7570 | 47.9 | $R_8 = -27.309$ | |
| | | | $R_9 = -27.309$ | $t_5 = 2.98$ |
| 5 STOP | 1.52642 | 60.0 | $R_{10} = +240.89$ | $s_4 = 3.19$ |
| | | | | $s_5 = 0.77$ |
| | | | $R_{11} = -42.191$ | |
| 6 | 1.72022 | 29.3 | $R_{12} = +19.868$ | $t_6 = 1.14$ |
| | | | $R_{13} = +19.868$ | $t_7 = 5.62$ |
| 7 | 1.67003 | 47.2 | $R_{14} = +47.991$ | $s_6 = 1.75$ |
| | | | $R_{15} = +67.586$ | |
| 8 | 1.67003 | 47.2 | $R_{16} = \infty$ | $t_8 = 2.29$ |
| | | | $R_{17} = \infty$ | $t_9 = 3.15$ |
| 9 | 1.67000 | 57.3 | $R_{18} = -22.259$ | $s_7 = 7.82$ |
| | | | $R_{19} = -17.305$ | $t_{10} = 1.04$ |
| 10 | 1.67000 | 57.3 | $R_{20} = -24.324$ | $s_8 = 0.50$ |
| | | | $R_{21} = \infty$ | |
| 11 | 1.52300 | 58.6 | $R_{22} = \infty$ | $t_{11} = 3.81$ |

\* \* \* \* \*